(12) United States Patent
Chopra et al.

(10) Patent No.: US 11,500,734 B2
(45) Date of Patent: Nov. 15, 2022

(54) SYSTEM AND METHOD FOR PRIORITIZING BACKUP GENERATION

(71) Applicant: EMC IP Holding Company LLC, Hopkinton, MA (US)

(72) Inventors: Shelesh Chopra, Bangalore (IN); Jaishree Balasubramanian, Bangalore (IN); Sujan Kumar Shetty, Udupi (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 228 days.

(21) Appl. No.: 16/802,063

(22) Filed: Feb. 26, 2020

(65) Prior Publication Data

US 2021/0263805 A1 Aug. 26, 2021

(51) Int. Cl.
*G06F 11/14* (2006.01)
*G06F 9/48* (2006.01)
*G06F 11/07* (2006.01)
*G06F 11/30* (2006.01)

(52) U.S. Cl.
CPC ........ *G06F 11/1461* (2013.01); *G06F 9/4881* (2013.01); *G06F 11/076* (2013.01); *G06F 11/1451* (2013.01); *G06F 11/1464* (2013.01); *G06F 11/1469* (2013.01); *G06F 11/3034* (2013.01)

(58) Field of Classification Search
CPC .......... G06F 11/1461; G06F 2201/815; G06F 9/4881; G06F 11/1464; G06F 11/3006; G06F 11/1451; G06F 11/1469; G06F 11/076; G06F 11/1466; G06F 11/3034

USPC ................................................. 711/162, 161
See application file for complete search history.

(56) References Cited

U.S. PATENT DOCUMENTS

| | | | |
|---|---|---|---|
| 8,924,352 B1 * | 12/2014 | Andruss | G06F 11/1461 |
| | | | 707/640 |
| 2009/0125577 A1 * | 5/2009 | Kodama | G06F 11/1458 |
| | | | 709/201 |
| 2012/0084501 A1 * | 4/2012 | Watanabe | G06F 11/1456 |
| | | | 711/112 |
| 2018/0060182 A1 * | 3/2018 | Rao Kotha | G06F 16/113 |
| 2020/0183731 A1 * | 6/2020 | Dornemann | G06F 11/1461 |

* cited by examiner

*Primary Examiner* — David Yi
*Assistant Examiner* — Zubair Ahmed
(74) *Attorney, Agent, or Firm* — Chamberlain, Hrdlicka, White, Williams & Aughtry

(57) ABSTRACT

A production host includes storage for storing backup priorities of entities and backup windows during which a system, of which the production host is a member, is predicted to have sufficient computing resources to generate a backup for an entity of the entities and a backup manager that identifies a backup generation event for the entity; in response to identifying the backup generation event: identifying an earliest potential backup window of the backup windows; making a determination that the earliest potential backup window of the backup windows is reserved for a second entity of the entities; in response to making the determination: identifying that a backup priority of the backup priorities that is associated with the entity is greater than a second backup priority of the backup priorities that is associated with the second entity; and providing the backup services to the entity during the earliest potential backup window.

17 Claims, 9 Drawing Sheets

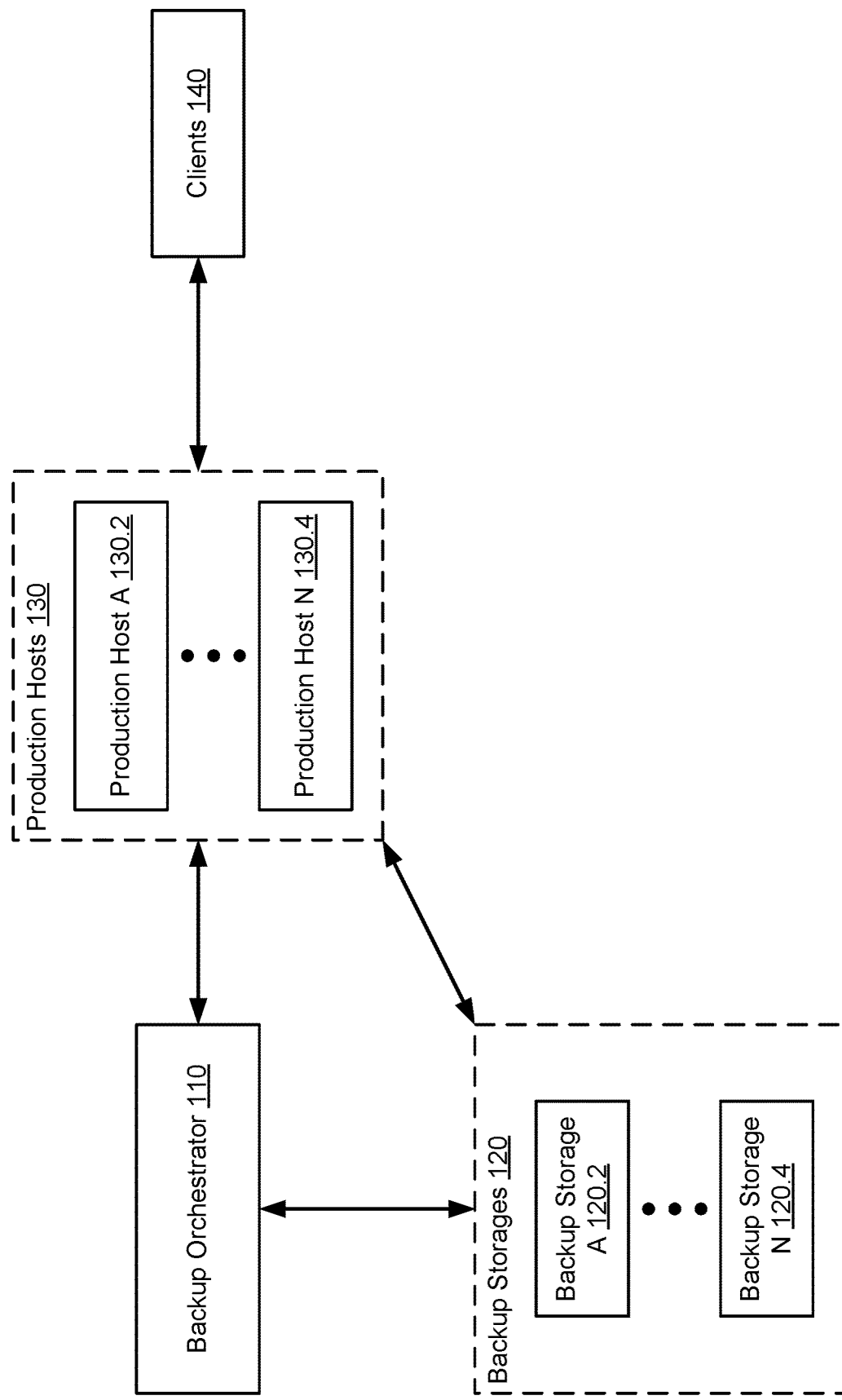

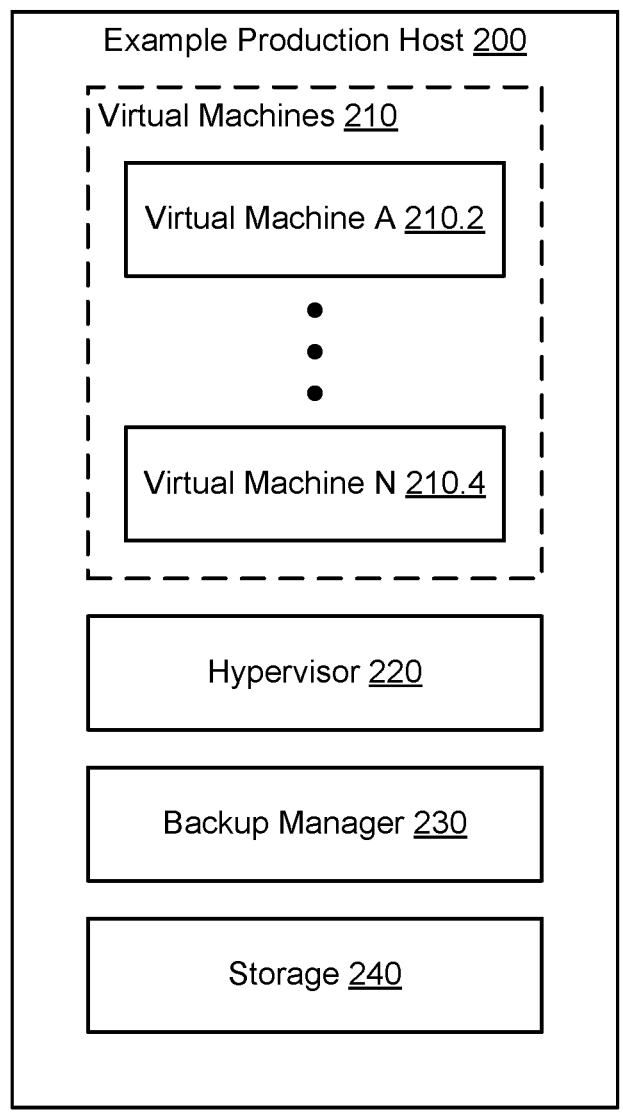
FIG. 2.1

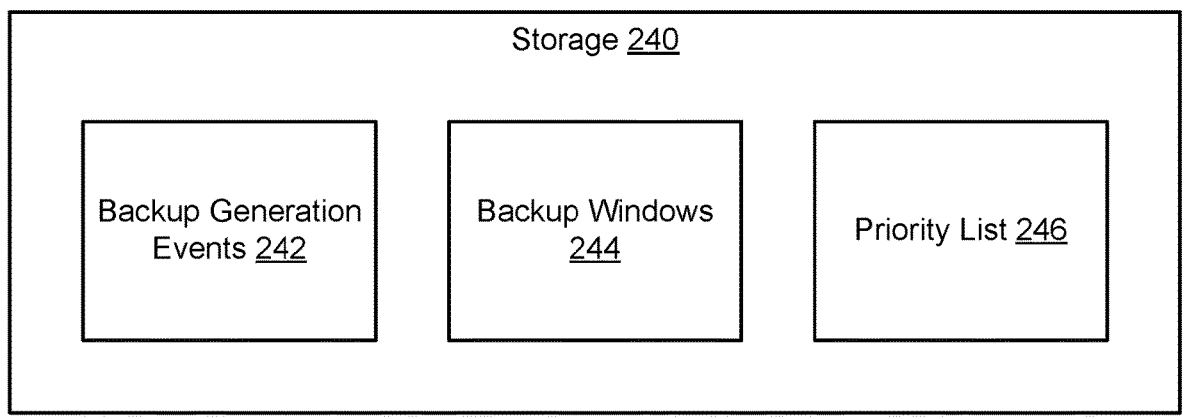
FIG. 2.2

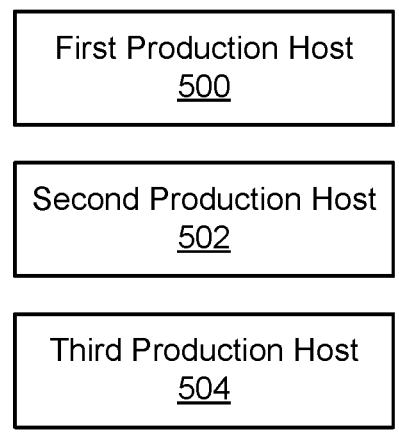
FIG. 5.1

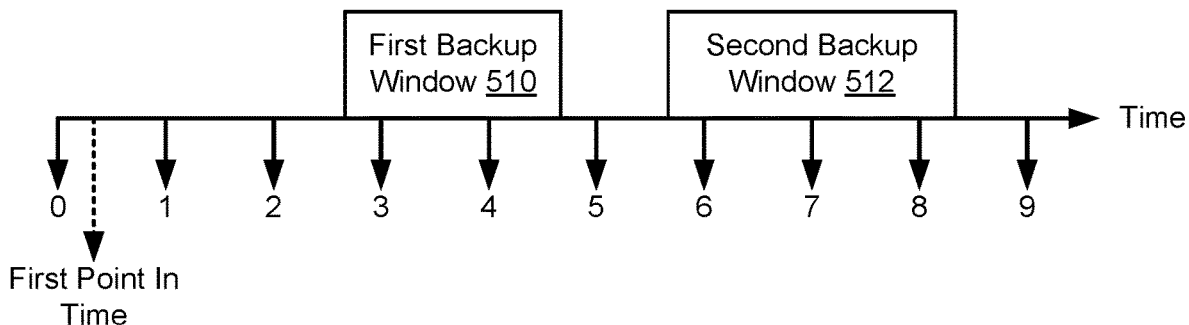
FIG. 5.2
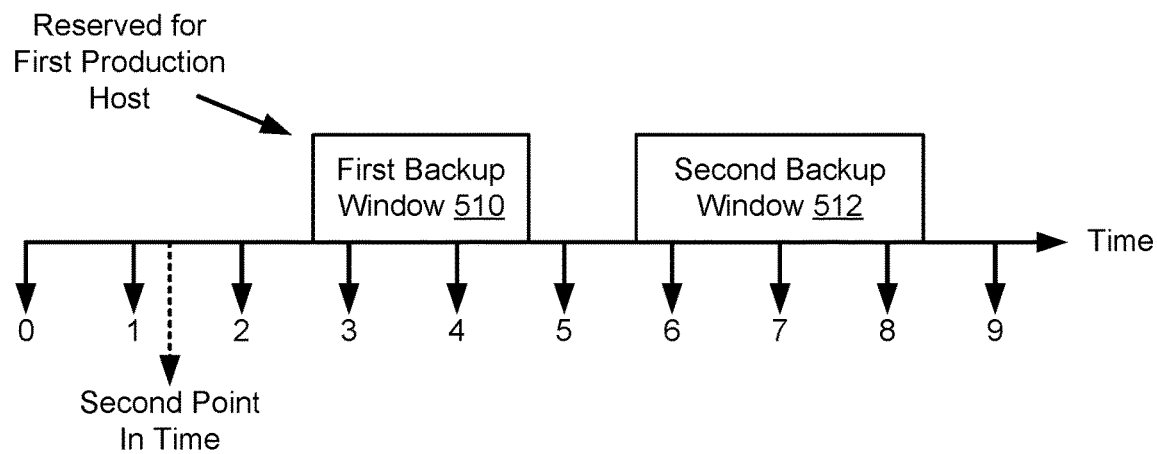
FIG. 5.3
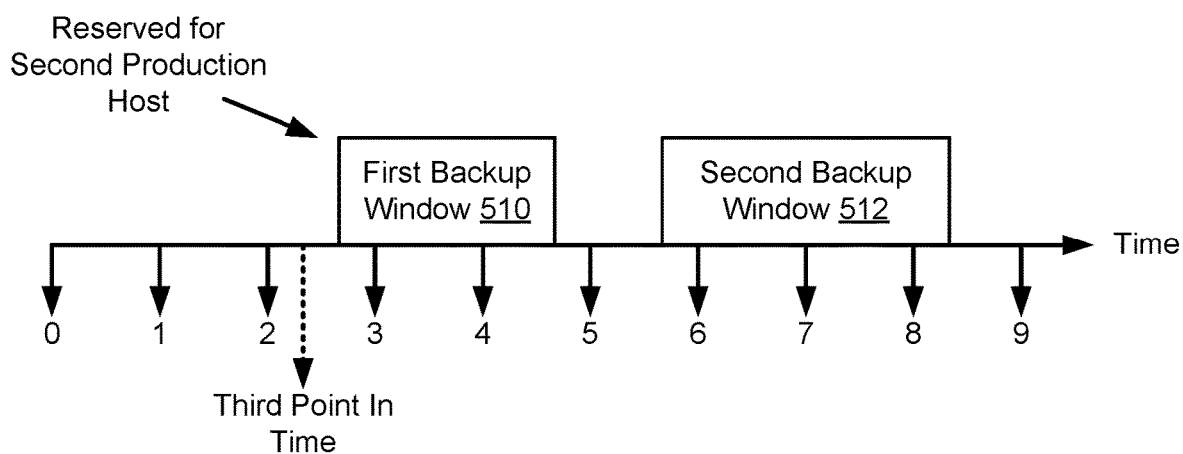
FIG. 5.4

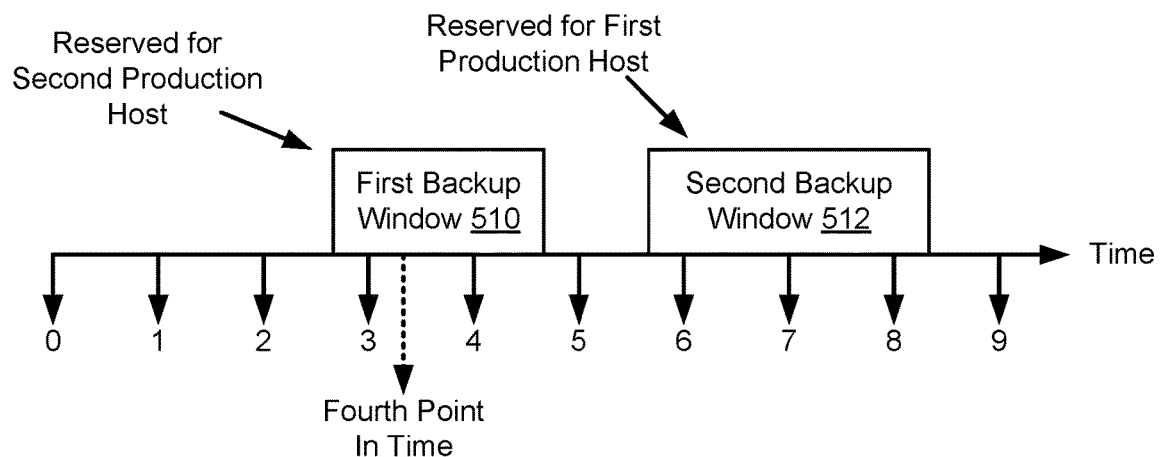
FIG. 5.5
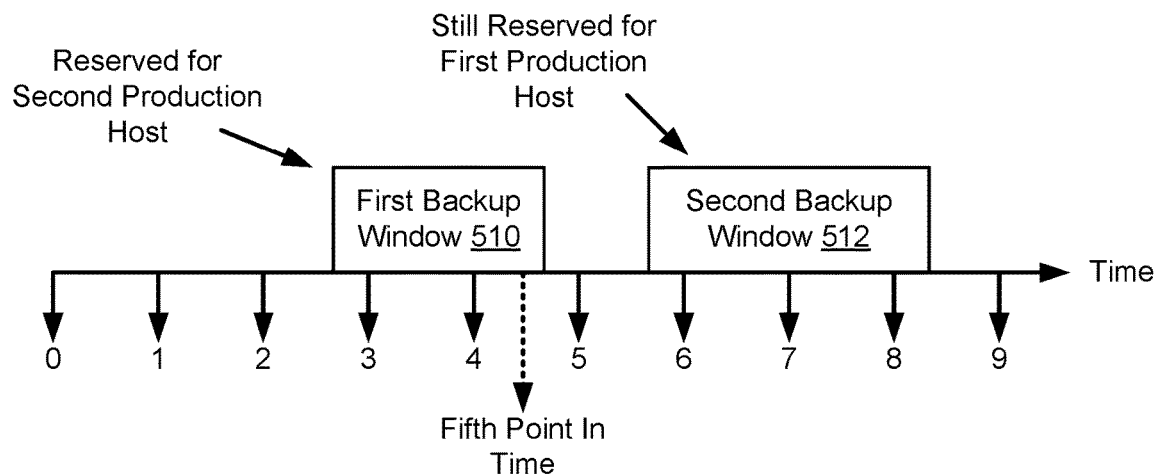
FIG. 5.6

SYSTEM AND METHOD FOR PRIORITIZING BACKUP GENERATION

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost due to device failure, software failure, etc., the data may be unrecoverable if no copies of the data were made and stored in locations other than the persistent storage.

SUMMARY

In one aspect, a production host for providing backup services to entities in accordance with one or more embodiments of the invention includes storage for storing backup priorities of the entities and backup windows during which a system, of which the production host is a member, is predicted to have sufficient computing resources to generate a backup for an entity of the entities. The production host further includes a backup manager that identifies a backup generation event for the entity; in response to identifying the backup generation event: identifying an earliest potential backup window of the backup windows; making a determination that the earliest potential backup window of the backup windows is reserved for a second entity of the entities; in response to making the determination: identifying that a backup priority of the backup priorities that is associated with the entity is greater than a second backup priority of the backup priorities that is associated with the second entity; and providing the backup services to the entity during the earliest potential backup window.

In one aspect, a method for providing backup services to entities in accordance with one or more embodiments of the invention includes identifying a backup generation event for an entity; in response to identifying the backup generation event: identifying an earliest potential backup window of backup windows for providing the backup services; making a determination that the earliest potential backup window of the backup windows is reserved for a second entity of the entities; in response to making the determination: identifying that a backup priority that is associated with the entity is greater than a second backup priority that is associated with the second entity; and providing the backup services to the entity during the earliest potential backup window.

In one aspect, a non-transitory computer readable medium in accordance with one or more embodiments of the invention includes computer readable program code, which when executed by a computer processor enables the computer processor to perform a method for providing backup services to entities, the method includes identifying a backup generation event for an entity; in response to identifying the backup generation event: identifying an earliest potential backup window of backup windows for providing the backup services; making a determination that the earliest potential backup window of the backup windows is reserved for a second entity of the entities; in response to making the determination: identifying that a backup priority that is associated with the entity is greater than a second backup priority that is associated with the second entity; and providing the backup services to the entity during the earliest potential backup window.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1 shows a diagram of a system in accordance with one or more embodiments of the invention.

FIG. 2.1 shows a diagram of an example production host in accordance with one or more embodiments of the invention.

FIG. 2.2 shows a diagram of a storage in accordance with one or more embodiments of the invention.

FIG. 5.1 shows a diagram of a non-limiting example of a system in accordance with embodiments of the invention.

FIGS. 5.2-5.6 show diagrams of reservations of backup windows by the system of FIG. 5.1 over time in accordance with embodiments of the invention.

DETAILED DESCRIPTION

Figure 3:
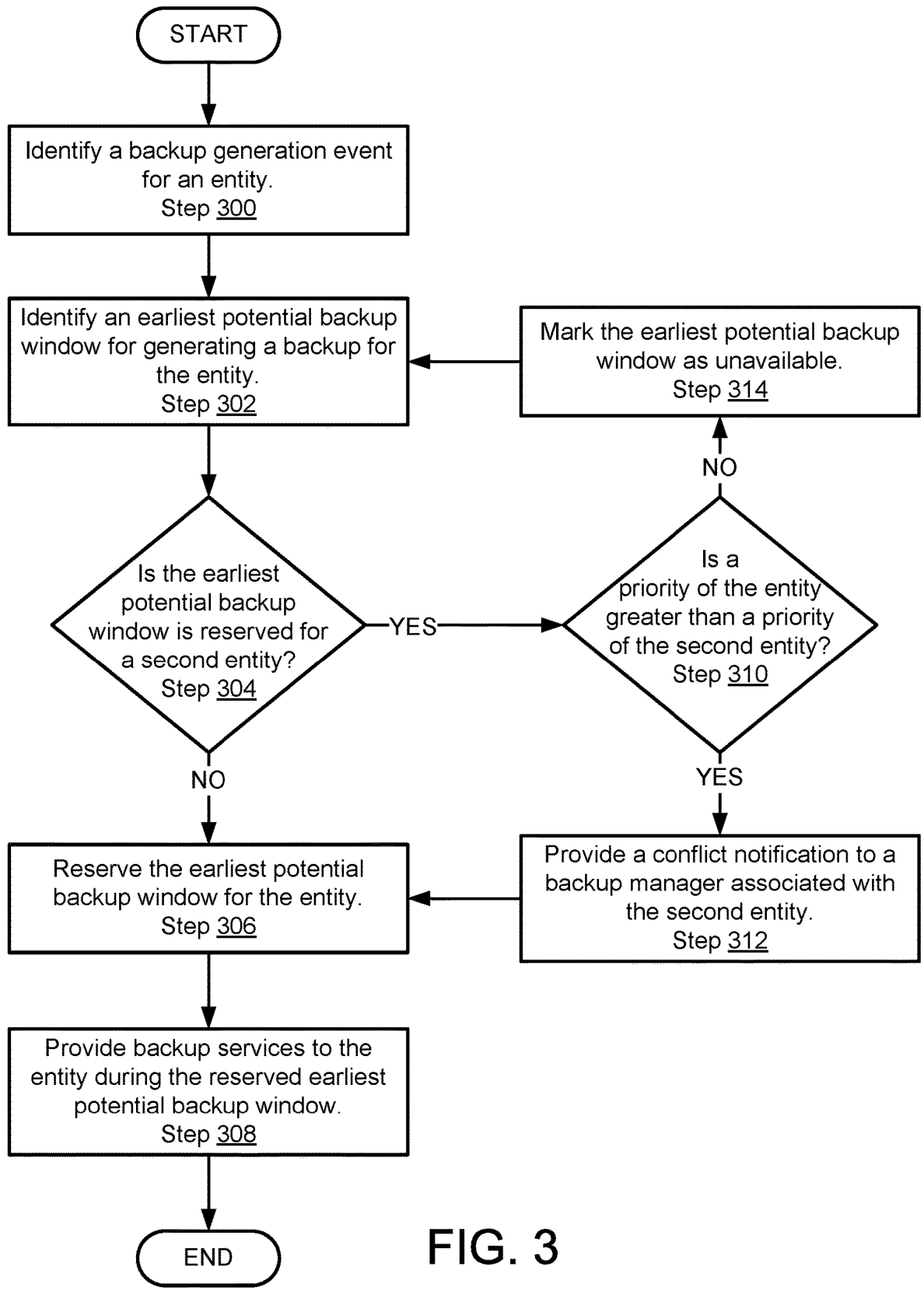
FIG. 3 shows a flowchart of a method of providing backup services in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. Specifically, embodiments of the invention may provide a system that enables unscheduled backups to be generated while avoiding backup generation collisions.

An unscheduled backup may be a backup that is generated in a manner that does not conform to a schedule. For example, an unscheduled backup may be one that is generated in response to the occurrence of a condition such as, for example, a predetermined amount of unbacked up data accumulating over time.

A backup generation collision may be the concurrent or an overlapping in time manner, of multiple backup generations (e.g., one or more actions performed by one or more devices to generate a backup for an entity) that negatively impact the functionality of the system (e.g., consume such a large quantity of computing resources that other functions of the system become impaired). A backup generation collision may occur, for example, when two or more backup generations are initiated that place a computational load on the system that is greater than the load that was assumed would be placed on the system when a backup generation would occur during the period of time.

Embodiments of the invention may provide a system that generates predictions of periods of time in the future (e.g., backup windows) during which it is believed that initiation of a backup generation will not negatively impact the functionality of the system. The system may also include backup managers that (i) initiate backup generations and (ii) cooperatively avoid backup generation collisions. The backup manager may avoid the backup generation collisions by reserving the period of time (i.e., the backup windows) predicted by the system in a manner that reduces the likelihood of losing high priority data. For example, the backup managers may utilize a ranking system that ensures entities that have more important data are given priority for reserving backup windows over those entities that have less important data.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services provided by the applications. The applications may be, for example, database applications, electronic communication applications, file storage applications, and/or any other type of application that may provide services to the clients (140). By utilizing these services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

The system may also include a backup orchestrator (110) that provides, in part, data protection services to the production hosts (130). The data protection services may include orchestrating generation of backups for the production hosts (130), orchestrating storage of the backups in backup storages (120), and/or orchestrating restoration of the production hosts (130) using backups stored in the backup storages (120) and/or other locations.

To orchestrate backup generation and storage, the backup orchestrator (110) may provide information to the production hosts (130) that enables the production hosts (130) to independently generate and/or store generated backups in the backup storages (120). The information may include when the system of FIG. 1 is likely to have sufficient computing resources for backup generation and/or storage purposes. The information may also include events that, when occur, cause the production hosts to initiate backup generation.

However, because the production hosts (130) each independently initiate backup generation, it may be problematic if, using the information regarding the availability of computing resources provided by the backup orchestrator (110), multiple production hosts initiate backup generation at the same time. In other words, when the backup orchestrator (110) identifies periods of time during which backup generation initiation is unlikely to negatively impact the operation of the system of FIG. 1, the orchestrator may identify those periods of time based on the assumption that the computing resource load placed on the system by the backup generation will be below a predetermined threshold. If this assumption is incorrect, the system of FIG. 1 may be negatively impacted by the initiated backup generations.

To address this and other potential issues regarding independent backup generation initiation by production hosts (130), each of the production hosts (e.g., 130.2, 130.4) may coordinate with each other to ensure that backup generation initiation collisions (e.g., when multiple production hosts (130) initiate backup generation in a manner that would place a computational load on the system of FIG. 1 that exceeds the underlying assumption regarding the load made by the backup orchestrator (110)). By avoiding backup generation initiation collisions, embodiments of the invention may provide a system that enables production hosts to independently initiate unscheduled backups (e.g., backups that are initiated upon the occurrence of a condition rather than in accordance with a predetermined schedule) without negatively impacting the quality of services provided to the clients (140) and/or other entities.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3-4. The clients (140) may be implemented using other types of computing devices without departing from the invention. For additional details regarding computing devices, refer to FIG. 6.

The clients (140) may be implemented using logical devices without departing from the invention. For example, the clients (140) may be implemented using virtual machines that utilize computing resources of any number of physical computing devices to provide the functionality of the clients (140). The clients (140) may be implemented using other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts (130), or a portion of the data of the production hosts, in the backup storages (120).

In one or more embodiments of the invention, the production hosts (130) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3-4. The production hosts (130) may be implemented using other types of computing devices without departing from the invention. For additional details regarding computing devices, refer to FIG. 6.

In one or more embodiments of the invention, the production hosts (130) are implemented using distributed computing devices. As used herein, a distributed computing device refers to functionality provided by a logical device that utilizes the computing resources of one or more separate and/or distinct physical computing devices. For example, in one or more embodiments of the invention, the production hosts (130) may be implemented using distributed devices that include components distributed across any number of separate and/or distinct computing devices. In such a scenario, the functionality of the production hosts (130) may be performed by multiple, different computing devices without departing from the invention.

The production hosts (130) may be implemented using logical devices without departing from the invention. For example, the production hosts (130) may be implemented using virtual machines that utilize computing resources of any number of physical computing devices to provide the functionality of the production hosts (130). The production hosts (130) may be implemented using other types of logical devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may include any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) provide backup generation services. Backup generation services may include (i) identifying periods of time during which the system of FIG. 1 is unlikely to be negatively impacted by initiation of backup generation and (ii) coordinate with any number of production hosts to initiate backup generations without causing backup generation initiation collisions. For additional details regarding production hosts (130), refer to FIG. 2.1.

In one or more embodiments of the invention, the backup storages (120) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 3-4. The backup storages (120) may be implemented using other types of computing devices without departing from the invention. For additional details regarding computing devices, refer to FIG. 6.

In one or more embodiments of the invention, the backup storages (120) are implemented using distributed computing devices. As used herein, a distributed computing device refers to functionality provided by a logical device that utilizes the computing resources of one or more separate and/or distinct computing devices. For example, in one or more embodiments of the invention, the backup storages (120) are implemented using distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored in the backup storages (120) includes backups of virtual machines hosted by the production hosts (130). For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used, alone or in combination with other backups, to restore the application data hosted by the virtual machine hosting the database to a state associated with the backup, i.e., the desired previous state.

In one or more embodiments of the invention, the data stored in the backup storages (120) includes backups of applications hosted by the production hosts (130). For example, the production hosts (130) may host a virtual machine that hosts any number of applications. At a future point in time, it may become desirable to restore the state of the applications hosted by the virtual machine to a previous state. To do so, previously stored application level backups may be utilized to selectively restore states of the applications to prior states associated with the application level backups.

While described above as storing backups of virtual machines (e.g., a virtual machine level backup) and/or applications (e.g., an application level backup), the backup storages (120) may store other types of data from the production hosts (130), or other entities, without departing from the invention. For example, the backup storages (120) may store archives or other data structures from the clients (140) and/or other entities.

In one or more embodiments of the invention, the backup orchestrator (110) is implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup orchestrator (110) described through this application and all, or a portion, of the methods illustrated in FIGS. 3-4. The backup orchestrator (110) may be implemented using other types of computing devices without departing from the invention. For additional details regarding computing devices, refer to FIG. 4.

In one or more embodiments of the invention, the backup orchestrator (110) is implemented using distributed computing devices. As used herein, a distributed computing device refers to functionality provided by a logical device that utilizes the computing resources of one or more separate and/or distinct computing devices. For example, in one or more embodiments of the invention, the backup orchestrator (110) is implemented using distributed devices that include components distributed across any number of separate and/or distinct computing devices. In such a scenario, the functionality of the backup orchestrator (110) may be performed by multiple, different computing devices without departing from the invention.

In one or more embodiments of the invention, the backup orchestrator (110) provides backup orchestration services. Backup orchestration services may include (i) monitoring components of the system of FIG. 1, (ii) generating predictions, based on the monitoring, of when it is likely that initiation of backup generation by a production host is unlikely to negatively impact the functionalities provided by the system of FIG. 1, (iii) provide the generated predictions to the production hosts (130), and/or (iv) provide information to the production hosts regarding when backups should be generated.

The predictions regarding when it is likely that initiation of backup generation by a production host is unlikely to negatively impact the functionalities provided by the system of FIG. 1 may be generated via any method without departing from the invention. For example, machine learning, stochastic modeling, or other types of algorithms may be used to generate the predictions based on monitoring of past behavior (e.g., availability of computing resources of one or more components of the system of FIG. 1) of the system of FIG. 1.

When generating the aforementioned predictions, the backup orchestrator (110) may make one or more assumptions regarding the likely computational impact that initiating a backup generation is likely to have on the system of FIG. 1. The backup orchestrator (110) may provide this information (referred to as "backup initiation assumption) to the production hosts (130). As will be discussed in greater detail below, the production hosts may use this information and/or the predictions to coordinate backup generation initiations to avoid backup generation initiation collisions.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production hosts (200) may provide: (i) application services to the clients and (ii) backup services to the entities that provide the application services to the clients.

To provide the aforementioned functionality of the example production host (200), the example production host (200) may include virtual machines (210), a hypervisor (220), a backup manager (230), and storage (240). Each component of the example production host (200) is discussed below.

The virtual machines (210) may be implemented using applications. For example, the virtual machines (210) may be applications executing using physical computing resources of the example production host (200) and/or other entities. In other words, each of the virtual machines (210) may be implemented as computer instructions stored on a persistent storage that when executed by a processor of the example production host (200) and/or other entities give rise to the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, file sharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide application services to clients (140, FIG. 1). The provided services may correspond to the type of application of each of the applications. When providing application services to the clients, data that is relevant to the clients may be received by and/or generated by the applications. The applications may store such relevant data as part of application data associated with respective applications in storage (240) of the example production host (200) and/or other entities.

In some embodiments of the invention, portions, or all, of the application data may be stored remotely from the example production host (200). For example, the application data may be stored in a second production host, a backup storage, or another entity, that does not host the applications. In some cases, the application data may be spanned across multiple entities or multiple copies of the application data may be stored in multiple virtual machines to facilitate cooperative action by multiple instances of an application that are hosted by multiple virtual machines. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized entity, e.g., one of the virtual machines (210).

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate different portions of the storage (240) of the example production host (200) to the virtual machines (210). Any quantity of storage resources of the storage may be allocated in any manner among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is implemented using a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented using computing code stored on a persistent storage that when executed by a processor performs the functionality of the hypervisor (220). The processor may be a hardware processor including circuitry such as, for example, a central processing unit or a microcontroller. The processor may be implemented using other types of hardware devices for processing digital information without departing from the invention.

The backup manager (230) may provide backup services. The backup services may include (i) obtaining information from the backup orchestrator including when backups should be generated and when backup generation initiation is unlikely to negatively impact the functionality of the system of FIG. 1, (ii) coordinate, using the obtained information, with other backup managers (230) to prevent backup generation initiation collisions when backups are generated, (iii) generating backups for the virtual machines (210) and/or other types of entities hosted by the example production host (200), and/or (iv) storing the backups in backup storage for future use.

When providing its functionality, the backup manager (230) may utilize the storage (240) by storing data structures including information used by the backup manager (230). For additional details regarding data structures that may be utilized by the backup manager (230) when providing its functionality, refer to FIG. 2.2.

Figure 4:
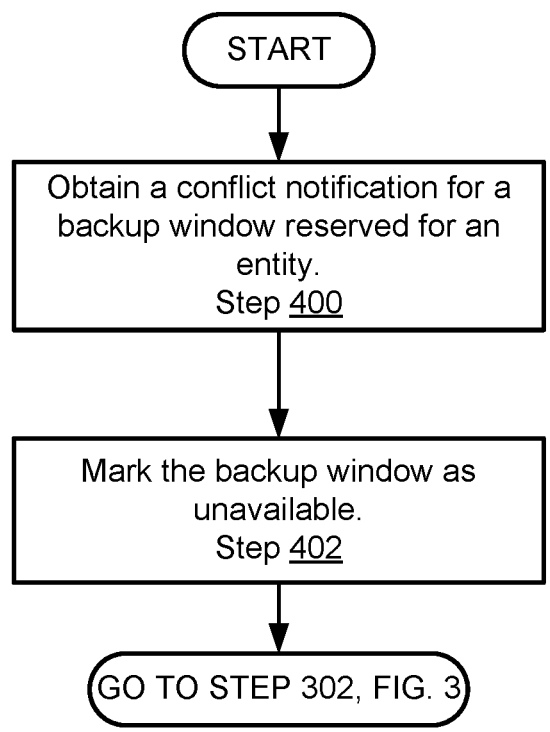
FIG. 4 shows a flowchart of a method of responding to a conflict notification in accordance with one or more embodiments of the invention.

To provide the above noted functionality of the backup manager (230), the backup manager (230) may perform all, or a portion, of the methods illustrated in FIGS. 3-4.

In one or more embodiments of the invention, the backup manager (230) is implemented using a hardware device including circuitry. The backup manager (230) may be implemented using, for example, a digital signal processor, a field programmable gate array, or an application specific integrated circuit. The backup manager (230) may be implemented using other types of hardware devices without departing from the invention.

In one or more embodiments of the invention, the backup manager (230) is implemented using computing code stored on a persistent storage that when executed by a processor performs all, or a portion, of the functionality of the backup manager (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, the backup manager (230) may utilize data structures stored in storage (240) when providing its functionality. FIG. 2.2 shows a diagram of the storage (240) in accordance with one or more embodiments of the invention.

In one or more embodiments disclosed herein, the storage (240) is implemented using devices that provide data storage services (e.g., storing data and providing copies of previously stored data). The devices that provide data storage services may include hardware devices and/or logical devices. For example, storage (240) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (240) may include a memory device (e.g., a dual in line memory device) in which data is stored and from which copies of previously stored data are provided. In another example, storage (240) may include a persistent storage device (e.g., a solid state disk drive) in which data is stored and from which copies of previously stored data is provided. In a still further example, storage (240) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (240) may store data structures including backup generation events (242), backup windows (244), and a priority list (246). Each of these data structures is discussed below.

Backup generation events (242) may be implemented using one or more data structures. The data structures may include information regarding when backups for various portions (e.g., virtual machines, applications, etc.) of a production should be generated. The information included in backup generation events (242) may be obtained from a backup orchestrator or any other entity.

The information included in the backup generation events (242) may include, for example, associations between (i) conditions that when met indicate that a backup should be generated and (ii) backup generation plans. A backup generation plan may include any number and quantity of details regarding how a backup should be generated, where a backup should be stored, the scope of information for which a backup is to be generated, and/or other types of information that enable a backup to be generated. The conditions that when met indicate that a backup should be generated may be any type and quantity of conditions. An example of a condition may be a quantity of data associated with an entity that is in an unbacked up state (e.g., unable to be restored using backups in backup storage). Other conditions may be used without departing from the invention.

The backup windows (244) may be implemented using one or more data structures. The data structures may include information regarding periods of time (e.g., windows) during which it is unlikely that initiation of a backup generation will negatively impact the functionality of the system of FIG. 1. The information may also include any assumptions upon which all, or a portion, of the periods of time are based. The information included in backup windows (244) may be obtained from a backup orchestrator or any other entity.

In one or more embodiments of the invention, the backup windows (244) include a list of periods of time in the future. As discussed above, the periods of time in the future may be predicted by the backup orchestrator as being periods of time during which backup generations may be initiated.

In one or more embodiments of the invention, the list of periods of time may also include (i) identifiers (e.g., labels) indicating whether the respective period of time is reserved and (ii) an identifier of the entity for which the period of time is reserved.

In one or more embodiments of the invention, each of the periods of time in the list of periods of time is associated with one or more assumptions upon which the period of time is based. The assumptions may include, for example, a quantity of data that will be backed up, a duration of time required to perform the backup, and/or the computing resources that will be expended to generate the backup.

The computing resources that will be expended to generate the backup may include any quantity and type of resource. The computing resources may be associated with a production host, a backup storage, and/or any other type of entity involved in the process of generating and storing a backup of an entity. As will be discussed in greater detail below, such information may be used when deciding whether a backup generation initiation conflict will occur.

The priority list (246) may be implemented using one or more data structures. The data structures may include information indicating a priority between entities for which backups may be generated. For example, the priority list (246) may be implemented as a list that ranks each entity for which a backup may be generated. The priority list (246) may be used to identify which entity should be allowed to initiate a backup generation when multiple entities each desire to generate a backup during a backup window (e.g., a period of time as discussed with respect to the backup windows (244)).

The priority list (246) may be maintained cooperatively by the backup managers of the system of FIG. 1. The priority of each entity may be based on, for example, characteristics including (i) a quantity of data associated with the entity that is in an unbacked up state, (ii) types of workloads being performed by the entity, (iii) the total quantity of data of the entity, (iv) an importance of the entity to the operation of the system of FIG. 1, and/or (v) other characteristics/information that may indicate the relative impact of data loss by an entity on the operation of the system of FIG. 1.

As the characteristics of an entity change, the backup manager tasked with providing backup services to the entity may identify the change in characteristics and notify the other backup managers regarding the change in priority. Consequently, the copy of the priority list (246) maintained by each of the backup managers may be consistent with the others. While described here as maintaining independent copies, a single shared copy of the priority list (246) may be maintained and used by the backup managers without departing from embodiments of the invention.

While the data structures stored in storage (240) have been described as including a limited amount of specific information, any of the data structures stored in storage (240) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number devices without departing from the embodiments disclosed herein.

Returning to FIG. 1, each of the production hosts (130) may cooperate to provide backup services in a manner that prevent backup generation initiation collisions from occurring. FIGS. 3-4 illustrate methods that may be performed by the production hosts of the system of FIG. 1 when providing backup services.

FIG. 3 shows a flowchart of a method in accordance with one or more embodiments of the invention. The method depicted in FIG. 3 may be used to provide backup services in accordance with one or more embodiments of the invention. The method shown in FIG. 3 may be performed by, for example, backup managers (e.g., 230, FIG. 2.1). Other components of the system illustrated in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a backup generation event for an entity is identified.

The backup generation event may be identified by monitoring the operation of the entity. As discussed above, a backup generation event may be the occurrence of a predetermined event that signals that a backup should be generated for the entity.

In one or more embodiments of the invention, the backup generation event is a quantity of unbacked up data of the entity reaching and/or exceeding a predetermined amount. The predetermined amount may be specified by, for example, a backup policy (e.g., a data structure including information that defines when and/or how backups are to be generated), an administrator (e.g., a person tasked with managing a system), or via any other method without departing from the invention. The predetermined amount may be based on, for example, characteristics provided by a backup orchestrator which maintain copies of backup policies to be enforced across any number of production hosts.

In step 302, an earliest potential backup window for generating a backup for the entity is identified. As discussed above, there may be a number of potential backup windows that could be reserved for backup generation initiation. However, not all of the backup windows may be available for reservation.

In one or more embodiments of the invention, the earliest potential backup window is identified using the backup windows (e.g., 244) data structure. As discussed above, the backup windows data structure may specify a number of periods of time in the future during which backups may be generated. The earliest potential backup window may be identified by, for example, identifying the earliest occurring in time window (specified by the backup windows) that is not marked as unavailable. However, the aforementioned window may be marked as reserved for a second entity.

In step 304, it is determined whether the earliest potential backup window is reserved for a second entity. The determination may be made by identifying whether a tag or other information associated with the backup window identified in step 302 indicates that the backup window is reserved.

For example, as discussed with respect to FIG. 2.2, the backup windows (e.g., 244) data structure may include information (i) indicating various periods of time (i.e. windows) during which backup generation may be initiated, (ii) whether the windows have been reserved by the other entities, (iii) whether the windows are unavailable, and (iv) if reserved, indicate an entity for which the windows are reserved. Thus, the determination may be made using the information included in the backup windows data structure which is cooperatively maintained (i.e., kept up to date) by the backup managers of the production hosts.

In some embodiments of the invention, the determination may be made by performing a computational resources availability analysis for generating a backup for the entity and the second entity concurrently to identify a hypothetical computational load that would be placed on the system of FIG. 1 by concurrently generating a backup for both the entity and the second entity. The computational resources availability analysis may be performed via any method (e.g., simulation, heuristically determined, expert system analysis, etc.).

As discussed with respect to FIG. 2.2, any backup window may have associated assumptions. Some of those assumptions may relate to a computational load expected to be placed on the system of FIG. 1 when a backup generation is initiated. The hypothetical computational load may be compared to the assumed computational load to determine whether the hypothetical computational load exceeds the assumed computational load. If the hypothetical computational load does not exceed the assumed computational load, it may be determined that the earliest potential backup window is not reserved because sufficient computing resources are likely going to be available to allow for concurrent backup generation initiation during the earliest potential backup window without cause a collision that would negatively impact the services provided by the system of FIG. 1. While described with respect to two entities, the aforementioned analysis may be performed for as many entities that have concurrently reserved a backup window without departing from the invention.

If it is determined that the earliest potential backup window is reserved, the method may proceed to step 310. If it is determined that the earliest potential backup window is not reserved, the method may proceed to step 306.

In step 306, the earliest potential backup window for the entity is reserved.

In one or more embodiments of the invention, the earliest potential backup window is reserved by adding information to the backup windows data structure indicating that the window identified in step 302 is reserved. For example, appropriate information (e.g., information indicating the reservation and/or information indicating that the reservation is for the entity) may be added to the backup windows data structure to indicate that the earliest potential backup window is reserved.

In one or more embodiments of the invention, other backup managers are notified of the reservation. For example, messages indicating the reservation may be sent to the other backup managers. Upon receipt, the other backup managers may update their copies of the backup windows data structure.

In step 308, backup services are provided to the entity during the reserved earliest potential backup window. The backup services may include (i) generating a backup for the entity and (ii) storing a copy of the backup in backup storage.

The method may end following step 308.

Returning to step 304, the method may proceed to step 310 following step 304 if the earliest potential backup window is reserved for a second entity.

In step 310, it is determined whether a priority of the entity is greater than a priority of the second entity. The determination may be made, for example, using backup priorities associated with the entity and second entity. The backup priorities may indicate a relative priority of the entity with respect to the second entity. For example, the backup priorities may be numbers that have different values. The larger of the values may indicate that the associated entity has a higher priority for backup generation purposes. The backup priorities may be included in a priorities list cooperatively maintained by the backup managers of a system.

If it is determined that the priority of the entity is greater than the priority of the second entity, then the method may proceed to step 312. If it is determined that the priority of the entity is less than the priority of the second entity, then the method may proceed to step 314.

In step 312, a conflict notification is provided to a backup manager associated with the second entity. The conflict notification may be provided to the backup manager via any method (e.g., inclusion in a message sent to the second entity). If the backup manager is providing backup services for both entities, the conflict notification may take the form of the information already available to the backup manager.

The conflict notification may be a data structure indicating that (i) the entity has a higher priority than the second entity and (ii) the second entity has lost its reservation. The conflict notification may also include an identity of the entity. The backup manager of the second entity may use the aforementioned information to identify that a new reservation of a backup window needs to be made for the second entity and to update information that it maintains to track reservations (e.g., the copy of the backup windows data structure that it utilizes). In a scenario in which a shared backup windows data structure is utilized, the backup manager of the second entity may rely on the backup manager of the entity to update the backup windows data structure, or vice versa.

The conflict notification may also be provided to other backup managers to enable them to update their data structures (e.g., the backup windows data structures) based on the change in reservation that occurs in steps 312 and 306.

The method may proceed to step 306 following step 312.

Returning to step 310, the method may proceed to step 314 following step 310 if the priority of the entity is not greater than a priority of the second entity.

In step 314, the earliest potential backup window is marked as unavailable. In other words, if the priority of the entity is less than that of the entity that has already reserved the earliest potential backup window, then the backup manager does not attempt to revoke the existing reservation. Rather, the backup manager may mark the earliest potential backup window as being unavailable and returns to step 302 to identify a different backup window as the earliest potential backup window.

The earliest potential backup window may be marked as unavailable by adding appropriate information to the backup windows data structure. For example, a label, text, or other indicator may be added to and/or associated with a window specified by the backup windows data structure that was identified as the earliest potential backup window in step 302. The information may indicate that the backup window is unavailable to the entity (though it may be available to other entities).

Thus, via the method illustrated in FIG. 3, one or more embodiments of the invention may facilitate the distributed, independent, and asynchronous initiation of backup generations in a manner that prevents and/or reduces the likelihood of backup generation initiation collisions. By doing so, phantom slowdowns or other quality of service issues caused by concurrent initiation of backup generations may be avoided. Accordingly, the experience of users of the system of FIG. 1 may be improved.

FIG. 4 shows a flowchart of a method in accordance with one or more embodiments of the invention. The method depicted in FIG. 4 may be used to address a conflict notification in accordance with one or more embodiments of the invention. The method shown in FIG. 4 may be performed by, for example, backup managers (e.g., 230, FIG. 2.1). Other components of the system illustrated in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a conflict notification for a backup window that is reserved for an entity is obtained. As discussed with respect to FIG. 3, the conflict notification may indicate that a reservation is being revoked in favor of another entity being allowed to reserve the backup window.

In step 402, the backup window is marked as unavailable. The backup window may be marked as unavailable by adding information to a backup windows data structure indicating that backup window is unavailable. The information may indicate that the backup window is unavailable to the entity (though it may be available to other entities).

At this point in the method, the backup window may no longer be reserved for the entity. Consequently, the entity may need to reserve a new backup window so that a backup may be generated.

The method may proceed to step 302 of FIG. 3 following step 402. By doing so, a new backup window may be reserved for generating a backup for the entity.

Thus, via the method illustrated in FIG. 3 one or more embodiments of the invention may facilitate the automatic reassignment of backup windows depending on the priority of entities for which backups are to be generated in a decentralized, asynchronous manner.

To further clarify embodiments of the invention, a non-limiting example is provided in FIGS. 5.1-5.6. FIG. 5.1 shows a diagram of an example system similar to that of FIG. 1. FIGS. 5.2-5.6 illustrate changes to the reservation of backup windows over time. For the sake of brevity, only a limited number of components of the system of FIG. 1 are illustrated in FIG. 5.1.

Example

Consider a scenario as illustrated in FIG. 5.1 in which a three production hosts (500, 502, 504) are hosting entities for which backup services are to be provided. As the system begins to operate, each of the production hosts host entities which begin to generate data that is in an unbacked up state. Consequently, backup windows need to be reserved for initiating generation of the required backups.

FIGS. 5.2-5.6 show diagrams that illustrate points in time, the available backup windows for generating backups, and the reservations of those backup windows as potential backup generation initiation conflicts are identified and remediated. In each of FIGS. 5.2-5.6, a timeline (horizontal line) is provided that begins on the left hand side of the page. The timeline includes an arrow pointing to the right that indicates increasing time. Demarcations (arrow pointing to 0, 1, 2, 3, 4, 5,) are provided along the timeline to indicate the periods of time. In each of the figures, an arrow having a dashed tail indicates that point in time that the information included along the timeline represents. The backup windows are indicated as boxes disposed along the timeline. The start, end, and width of these boxes indicate the beginning, duration, and end of the respective backup windows.

Turning to FIG. 5.2, at a first point in time, none of the backup managers have encountered a backup generation event. Two backup windows (510, 512) are currently available for reservation.

Turning to FIG. 5.3, at a second point in time, the first production host (500) encounters a backup generation event for a virtual machine that it hosts. The virtual machine hosts a file sharing application. Based on the importance of the file sharing application, the first production host (500) has a backup priority of 5.

In response to encountering the backup generation event, the first production host (500) identifies the first backup window (510) as the earliest potential backup window, identifies that is not reserved, and reserves the first backup window. Consequently, the first backup window (510) is now reserved while the second backup window (512) is not reserved. The first production host (500) sends a notification to the second and third production hosts indicating that the first backup window (510) has been reserved.

Turning to FIG. 5.4, at a third point in time, the second production host (502) encounters a backup generation for a second virtual machine that it hosts. The second virtual machine hosts a database application that includes financial information for a company. Based on the importance of the database application, the second production host (502) has a backup priority of 9, which is greater than the backup priority of the first production host (500).

In response to encountering the backup generation event, the second product host (502) identifies the first backup window (510) as the earliest potential backup windows. However, because the first backup window (510) is reserved by the first production host (500), the second production host (502) compares its priority to that of the first production host (500), identifies that it is larger, sends a conflict notification to the first production host (500) and the third production host (504) indicating that it is reserving the first backup window (510), and reserves the first backup window (510).

After identifying that it has lost its reservation, the first production host (500) identifies the second backup window (512) as the earliest potential backup window and reserves it at a fourth point in time because the first backup window (510) is (i) no longer available and (ii) the current time has exceeded the beginning of the first backup window (510), as illustrated in FIG. 5.5. As a note, had the current time not exceeded the beginning of the first backup window (510), the first production host (500) would have checked its backup priority of its filing sharing application against the backup priority of the database application because the first backup window (510) would still have been identified as the earliest potential backup window. As discussed above, backup priorities may dynamically change over time so even though a backup window may have been lost and reserved for another entity, a check of the backup windows and corresponding priorities would still be performed.

At a fifth point in time as illustrated in FIG. 5.6, the third production host (504) encounters a backup generation event for a third virtual machine that it hosts. The third virtual machine hosts an instant messaging application. Based on the importance of the instant messaging application, the third production host (504) has a backup priority of 1.

In response to encountering the backup generation event, the third production host (504) identifies the second backup window (512) as the earliest potential backup windows. However, because the second backup window (512) is reserved by the first production host (500), the third production host (504) compares its priority to that of the first production host (500), identifies that it is smaller, and does not attempt to reserve the second backup window.

Consequently, the second backup window (512) is still reserved for the first production host, as illustrated in FIG. 5.6.

End of Example

Figure 6:
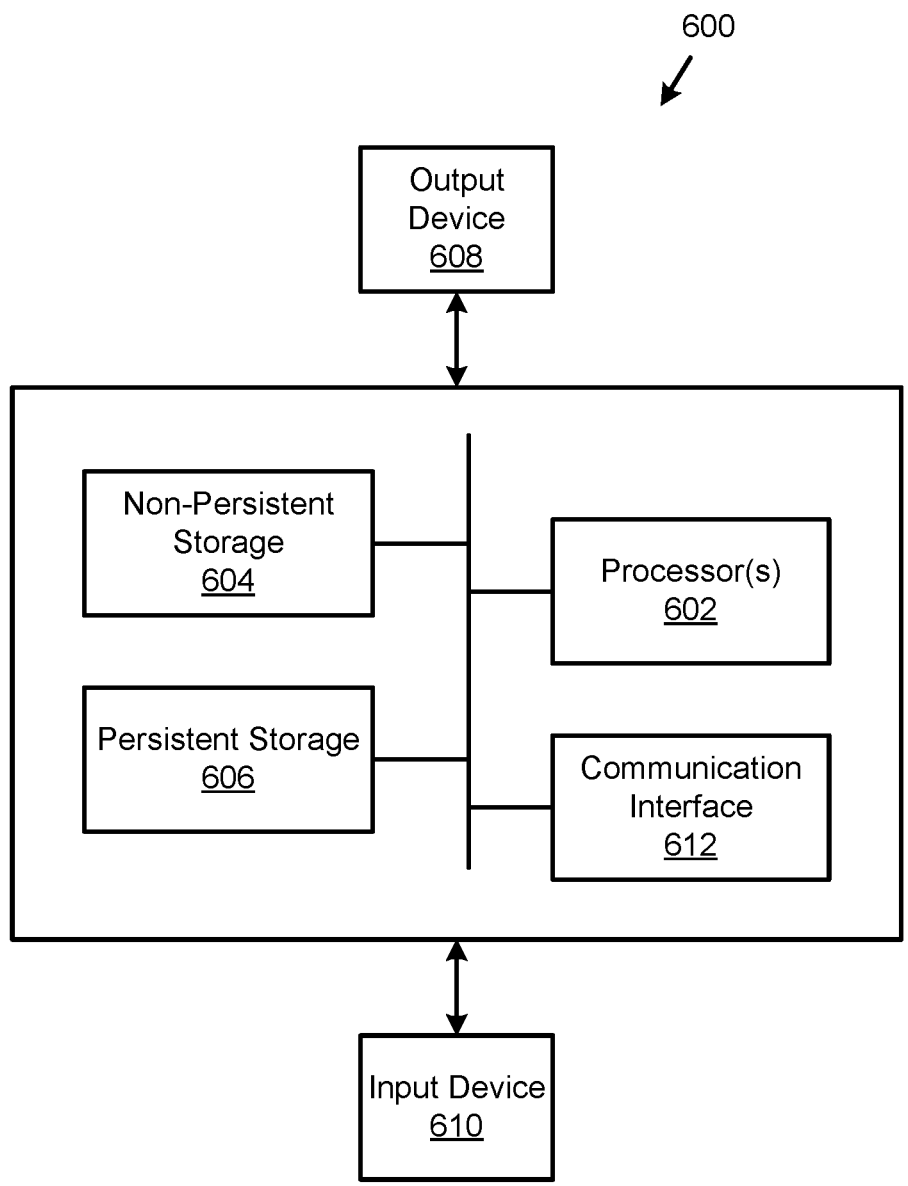
FIG. 6 shows a diagram of a computing device in accordance with one or more embodiments of the invention.

Any of the components of FIG. 1 may be implemented u distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for enabling distributed, asynchronous, independent backup generation initiation without causing backup generation initiation collisions. By doing so, phantom slowdowns and/or other degradations in user experience may be prevented and/or mitigated.

Additionally, by enabling backup generation to be performed independently from a schedule, the total number of backups necessary to provide a desired level of data protection may be reduced. For example, by allowing backups to be unscheduled (e.g., generated in response to the occurrence of events rather than at predetermined times), generation of backups that only impact a small amount of data may be avoided. Consequently, the quality of services provided by a system in accordance with embodiments of the invention may be improved by reducing the quantity of computationally costly backup generation performed by the system.

Thus, embodiments of the invention may address the problem of the limited availability of computational resources in a distributed system that relies on data redundancy for data protection purposes. Specifically, embodiments of the invention may provide a method of reducing the number of backups that are generated while still meeting data protection goals.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host for providing backup services to entities, comprising:
storage for storing:
backup priorities of the entities, and
backup windows during which a system, of which the production host is a member, is predicted to have sufficient computing resources to generate a backup for an entity of the entities; and
a backup manager programmed to:
identify a backup generation event for the entity;
in response to identifying the backup generation event:
identify an earliest potential backup window of the backup windows;
make a determination that the earliest potential backup window of the backup windows is reserved for a second entity of the entities;
in response to making the determination:
identify that a backup priority of the backup priorities that is associated with the entity is greater than a second backup priority of the backup priorities that is associated with the second entity; and
provide the backup services to the entity during the earliest potential backup window,
identify an occurrence of a priority change event associated with the entity; and
in response to identifying the occurrence of the priority change event, send a priority change notification to one or more other backup managers, the one or more other backup managers comprising a second backup manager associated with the second entity,
wherein the priority change notification specifies a change in the backup priority associated with the entity, and
wherein each of the backup manager and the one or more other backup managers maintains an independent copy of the backup priority.

2. The production host of claim 1, wherein the backup manager is further programmed to:
in response to making the determination:
reserve the earliest potential backup window for the entity; and
send a conflict notification to the second entity,
wherein the conflict notification is adapted to cause a new backup window to be reserved for the second entity.

3. The production host of claim 1, wherein the backup priorities of the entities are based, at least in part, on respective quantities of data associated with each of the entities that are in an unbacked up state.

4. The production host of claim 1, wherein the backup priorities of the entities are based, at least in part, on types of workloads being performed by the entities.

5. The production host of claim 1, wherein the backup generation event is a quantity of data associated with the entity that is in an unbacked up state exceeding a threshold.

6. The production host of claim 1, wherein providing the backup services to the entity during the earliest potential backup window comprises:
generating a backup of the entity; and
storing a copy of the backup in a backup storage that is distinct from the production host.

7. A method for providing backup services to entities, comprising:
identifying a backup generation event for an entity;
in response to identifying the backup generation event:
identifying an earliest potential backup window of backup windows for providing the backup services;
making a determination that the earliest potential backup window of the backup windows is reserved for a second entity of the entities;
in response to making the determination:
identifying that a backup priority that is associated with the entity is greater than a second backup priority that is associated with the second entity; and
providing the backup services to the entity during the earliest potential backup window;
identifying an occurrence of a priority change event associated with the entity;
in response to identifying the occurrence of the priority change event, sending a priority change notification to one or more other backup managers, the one or more other backup managers comprising a second backup manager associated with the second entity,
wherein the priority change notification specifies a change in the backup priority associated with the entity, and
wherein each of the backup manager and the one or more other backup managers maintains an independent copy of the backup priority.

8. The method of claim 7, wherein method further comprises:
in response to making the determination:
reserving the earliest potential backup window for the entity; and
sending a conflict notification to the second entity,
wherein the conflict notification is adapted to cause a new backup window to be reserved for the second entity.

9. The method of claim 7, wherein the backup priority and the second backup priority are based, at least in part, on quantities of data associated with the entity and the second entity, respectively, that are in an unbacked up state.

10. The method of claim 7, wherein the backup priority and the second backup priority are based, at least in part, on types of workloads being performed by the entity and the second entity, respectively.

11. The method of claim 7, wherein the backup generation event is a quantity of data associated with the entity that is in an unbacked up state exceeding a threshold.

12. The method of claim 7, wherein providing the backup services to the entity during the earliest potential backup window comprises:
generating a backup of the entity; and
storing a copy of the backup in a backup storage that is distinct from a production host that generated the backup of the entity.

13. A non-transitory computer readable medium comprising computer readable program code, which when executed by a computer processor enables the computer processor to perform a method for providing backup services to entities, the method comprising:

identifying a backup generation event for an entity;

in response to identifying the backup generation event:

identifying an earliest potential backup window of backup windows for providing the backup services;

making a determination that the earliest potential backup window of the backup windows is reserved for a second entity of the entities;

in response to making the determination:

identifying that a backup priority that is associated with the entity is greater than a second backup priority that is associated with the second entity; and providing the backup services to the entity during the earliest potential backup window;

identifying an occurrence of a priority change event associated with the entity; and in response to identifying the occurrence of the priority change event, sending a priority change notification to one or more other backup managers, the one or more other backup managers comprising a second backup manager associated with the second entity, wherein the priority change notification specifies a change in the backup priority associated with the entity, and wherein each of the backup manager and the one or more other backup managers maintains an independent copy of the backup priority.

14. The non-transitory computer readable medium of claim 13, wherein method further comprises:

in response to making the determination:

reserving the earliest potential backup window for the entity; and sending a conflict notification to the second entity, wherein the conflict notification is adapted to cause a new backup window to be reserved for the second entity.

15. The non-transitory computer readable medium of claim 13, wherein the backup priority and the second backup priority are based, at least in part, on quantities of data associated with the entity and the second entity, respectively, that are in an unbacked up state.

16. The non-transitory computer readable medium of claim 13, wherein the backup priority and the second backup priority are based, at least in part, on types of workloads being performed by the entity and the second entity, respectively.

17. The non-transitory computer readable medium of claim 13, wherein the backup generation event is a quantity of data associated with the entity that is in an unbacked up state exceeding a threshold.

* * * * *